April 7, 1970   J. SOULEZ-LARIVIERE ET AL   3,504,991
PROPELLER HUB BLOWING DEVICE
Filed Dec. 22, 1967
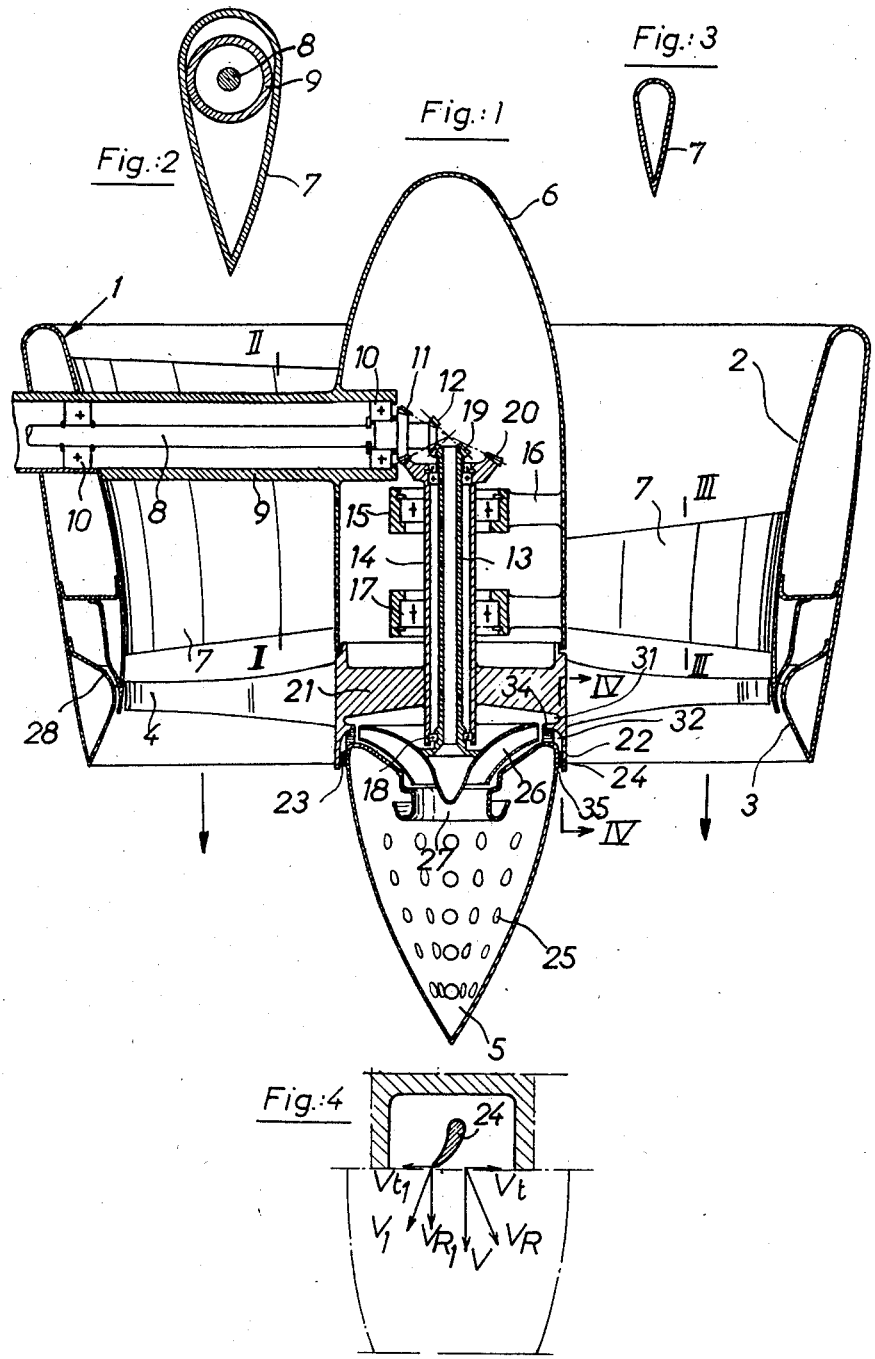

3,504,991
PROPELLER HUB BLOWING DEVICE

Jean Soulez-Lariviere, La Celle-Saint-Cloud, and Bernard Biot, Vernouillet, France, assignors to Bertin & Cie, a French company
Filed Dec. 22, 1967, Ser. No. 692,958
Claims priority, application France, Dec. 26, 1966, 88,790
Int. Cl. B64c *11/02*
U.S. Cl. 416—90                    4 Claims

ABSTRACT OF THE DISCLOSURE

The invention comprehends a propeller hub blowing device comprising a propeller, a hub, therefor, means defining a blowing slot disposed tangentially relative to a downstream section of said hub, a pressure fluid generator disposed in said hub, means for rotating said propeller, means for conveying power from said propeller rotating means to said generator to operate said generator, said generator being operable to feed pressurized fluid to said blowing slot.

---

It has already been proposed to improve the efficiency of a propeller in a fairing by blowing fluid tangentially of the propeller hub so as to prevent separation of the fluid stream which is particularly undesirable when the fluid flow displaced by the propeller has to be recompressed by a diffusion at a high rate.

One of the objects of the present invention is to effect said tangential blowing of fluid relative to the hub of a propeller with the aid of a pressure fluid generator disposed in the hub and receiving the power necessary to operate it, from means ensuring at the same time, the rotation of the propeller.

According to one advantageous way of carrying the invention into effect, the generator is a compressor disposed coaxially with respect to the propeller and delivering fluid under pressure to an annular passage. According to the invention, the downstream part of this passage is usefully formed by the wall of the hub on the one hand and by a wall surrounding the latter, on the other. The compressor is fed with fluid under pressure from apertures provided in the fairing of the hub downstream of the propeller, the apparatus as a whole providing the fluid with a passage the total section of which is sufficiently large for the correct operation of the compressor.

The invention also has the object of making one of the walls of the annular passage as an extension of the propeller blade carrier. Owing to this, the downstream part of the hub and the blowing fluid rotate with the propeller and such fluid becomes "spun."

It is again an object of the invention to provide in the annular passage, blades directed in the sense opposite to that of the rotation of the hub to straighten-up the "spun" blowing fluid and to bring the direction of its flow nearer to that of the fluid flow displaced by the propeller.

In the accompanying drawings:

FIGURE 1 shows a section passing through the axis of a propeller disposed in a fairing, including a propeller hub blowing device according to the invention;

FIGURES 2 and 3 are respectively partial sections on lines II—II and III—III of FIGURE 1; and FIGURE 4 represents diagrammatically, the device with a blade and the constitution of the velocities of the fluid, as a section according to IV—IV in FIGURE 1.

FIGURE 1 shows a fairing 1 composed of a convergent part 2 and a divergent part 3 of progressive curvature and connected without discontinuity of curvature.

A propeller 4 is situated downstream of the neck of the fairing. Its hub comprises two fairings 5 and 6, the downstream fairing 5 being integral with the propeller as will be explained hereinafter. The fairing 6 is fixed and connected to the fairing 1 by shaped arms 7 (see also FIGS. 2 and 3).

One of the arms 7 includes a tube 9 supporting a motor shaft 8, by means of roller bearings 10.

At the end of the shaft 8, two bevel gears 11 and 12 transmit the rotary movement from the motor shaft 8 to two axial shafts 14 and 13 respectively. The shaft 14 is supported by bearings 15, having rollers 17, fixed to the part 6 of the hub by means of arms 16. The shaft 13 is supported within the shaft 14 by roller bearings 18. The bevel gears 19 and 20 fixed respectively to the ends of the shafts 13 and 14, co-operate with the bevel gears 12 and 11 respectively.

The shaft 14 drives the propeller 4 through a blade carrier 21 integral with both the propeller and the shaft. This blade carrier 21 includes extensions 31 and 22 defining respectively with a wall element 32 and with the downstream fairing 5 of the hub, an annular curved passage 23 divided into partial ducts by the stays or blades 24 and 34 ensuring the connection between the propeller 4 and the fairing 5 which turns, therefore, with the propeller.

The fairing 5 has openings 25 providing a total passage sufficient for feeding a compressor 26. The latter, as well as its air inlet 27, are coaxial with the propeller, the compressor rotor being integral with the shaft 13.

The fluid is sucked-in by the compressor through the openings 25, then compressed in the curved annular passage 23 the downstream part of which directs the fluid flow tangentially with respect to the fairing 5.

The jet discharged through the orifice 35 with a velocity of V, rotates with the hub at a linear velocity $V_t$ (see FIGURE 4). It will be "spun" according to $V_R$ downstream of the orifice 35 if the blades 24 were parallel to the axis of the apparatus and, in this case, would involve losses.

To overcome this disadvantage, the blades 24 are inclined at least near their downstream edge so as to deflect the jet and so as to discharge it with a velocity $V_1$ having a component $V_{t1}$ of the same value and of opposite sense to $V_t$. The jet will then flow according to $V_{R1}$ substantially parallel to an axial plane of the apparatus, thus, substantially in the direction of the fluid flow displaced by the propeller.

The jet is delivered through the orifice 35 at a velocity sufficient to regenerate the marginal layers preventing separation of the fluid stream at the fairing 5. The movement transmission systems are determined preferably so that the velocity of fluid discharge at the orifice 35 is greater by at least 15% than the mean velocity of the fluid flow displaced by the propeller.

The device shown in FIG. 1 also includes a blowing slot 28 in the fairing 1, downstream of the propeller, this slot being fed by means not shown, preventing separation of the stream of fluid at the fairing 1.

We claim:
1. In combination with an impeller having a rotary hub with a hollow section extending downstream of said impeller, a boundary layer control device to prevent flow separation of the fluid stream delivered by said impeller from the outer surface of said hollow section, comprising blower means housed in said hollow section and having a suction side and a discharge side, a plurality of sucking ports formed through a downstream end portion of said surface and connected with said suction side, and annular slot-like nozzles opening tangentially to said surface in a downstream direction, at a location upstream of said ported end portion thereof, and connected with said discharge side, and guide vanes in said annular slot-like nozzle, designed to deflect fluid issuing therefrom in a direction opposite to the rotation of said rotary hub.

2. Boundary layer control device as claimed in claim 1, wherein said guide vanes are designed so as to impart to said fluid issuing from said nozzle a velocity component substantailly equal and opposite to the tangential velocity of said rotary hub.

3. Boundary layer control devices as claimed in claim 1, wherein said annular slot-like nozzle forms a bend with an inlet end facing radially inward of said hollow hub and an outlet end facing tangentially outward thereof.

4. Boundary layer control devices as claimed in claim 3, wherein said guide vanes are positioned adjacent said outlet end, said device comprising further vanes positioning adjacent said inlet end.

References Cited

UNITED STATES PATENTS

| | | | |
|---|---|---|---|
| 2,079,258 | 5/1937 | Kerr. | |
| 2,294,586 | 9/1942 | Troller | 230—117 |
| 2,758,815 | 8/1956 | Fontaine et al. | 253—117 |
| 2,808,197 | 10/1957 | Forgo | 230—120 |

EDWARD J. MICHAEL, Primary Examiner

U.S. Cl. X.R.

230—120; 416—91, 93

UNITED STATES PATENT OFFICE
CERTIFICATE OF CORRECTION

Patent No. 3,504,991                                April 7, 1970

Jean Soulez-Lariviere et al.

It is certified that error appears in the above identified patent and that said Letters Patent are hereby corrected as shown below:

Column 2, line 71, "and annular slot-like nozzles" should read -- an annular slot-like nozzle --. Column 3, line 8, "substantailly" should read -- substantially --.

Signed and sealed this 16th day of February 1971.

(SEAL)
Attest:

Edward M. Fletcher, Jr.                            WILLIAM E. SCHUYLER, JR.
Attesting Officer                                         Commissioner of Patents